UNITED STATES PATENT OFFICE 2,432,341

CELLULOSE ESTERS

George W. Seymour and Mervin E. Martin, Cumberland, Md., assignors to Celanese Corporation of America, a corporation of Delaware No Drawing. Application July 2, 1946,
Serial No. 681,146

7 Claims. (Cl. 260—230)

This invention relates to the production of organic acid esters of cellulose, such as cellulose acetate, and relates more particularly to an improved process for the treatment of organic acid esters of cellulose prior to ripening or hydrolysis whereby cellulose esters of a high order of stability may be obtained.

An object of this invention is to provide an improved process for the treatment of primary organic acid esters of cellulose prior to ripening or hydrolysis whereby the combined sulfuric acid present therein is substantially completely removed and organic acid esters of cellulose of a high order of stability and improved molding properties are obtained when the latter are ripened to the desired acyl value.

Other objects of this invention will appear from the following detailed description.

In the process of preparing organic acid esters of cellulose, such as cellulose acetate, for example, the esterification reaction is usually carried out by treating cellulose with an organic acid anhydride in the presence of a catalyst such as sulfuric acid or phosphoric acid, and an organic acid diluent, or solvent, for the cellulose ester being formed. The fully esterified cellulose tri-ester produced is obtained in the form of a viscous, homogeneous solution in the organic acid diluent employed. Water is then added to this primary cellulose ester solution in an amount sufficient to convert any organic acid anhydride remaining to the corresponding acid. The primary cellulose ester, usually after the addition of a further quantity of water, is permitted to hydrolyze or ripen in solution from the cellulose tri-ester initially formed to a secondary cellulose ester, i. e. one of a lower degree of esterification, having the desired solubility characteristics. During ripening not only are acyl groups hydrolyzed but, in addition, combined sulfuric acid is removed from the cellulose ester. Water and/or other non-solvent for the cellulose ester is then added in amounts sufficient to precipitate the ripened or secondary cellulose ester from solution. The precipitated cellulose ester is washed with water to remove as much acid and other non-cellulose ester materials as possible and is then subjected to a stabilizing treatment with the object of still further reducing its content of combined sulfuric acid.

Any combined sulfuric acid imparts to the cellulose ester a tendency to decompose, degrade and/or discolor, particularly when the cellulose ester is exposed to heat as during molding operations. The substantnial removal of the combined sulfuric acid is exceedingly important if a product of desirable molding properties is to be obtained. The stability of the product may be measured by the degree of acidity developed when a sample of the cellulose ester is treated with distilled water at elevated temperature and pressure for a predetermined period of time. The development of excess acidity denotes a product of unsatisfactory stability. Since the stabilizing treatment may take from 3 to 6 hours to achieve the desired stability in the product, any improvement in the stability characteristics of said ripened organic acid esters of cellulose which can be effected through the removal of any combined sulfuric acid present therein prior to or during the ripening process itself, and thus reduce the time necessary to effect stabilization, obviously will be of great economic value.

We have now found that improved organic acid esters of cellulose of a high order of stability due to the substantially complete removal of combined sulfates may be obtained by a novel process involving the treatment of the primary organic acid ester of cellulose while in solution prior to ripening or hydrolysis. In accordance with the novel process of our invention, we remove the combined sulfates from said organic acid esters of cellulose by heating the solution of the primary organic acid ester of cellulose initially obtained on completion of esterification to an elevated temperature of about 60 to 90° C. by the direct injection of steam therein while no free sulfuric acid is present, and, after adding a relatively small quantity of free sulfuric acid, heat the acidified solution for a short period of time at about 100° C. The free sulfuric acid is then completely neutralized and the primary organic acid ester of cellulose in solution is then hydrolyzed at that temperature to a secondary cellulose ester of the desired acyl value.

We have found that a high temperature in combination with a moderate amount of water present favors the splitting off of the combined sulfates. The localized conditions created by the steam injection heating method that we employ together with the relatively small quantities of water which are added through the medium of the condensed steam causes the combined sulfates to split off almost instantaneously. Such a treatment together with the additional heating of the acidified solution removes all but the most insignificant quantities of combined sulfate. After neutralization of the relatively small quantity of sulfuric acid added to insure complete splitting off of the sulfates, the neutralized primary solution of the organic acid ester of cellulose is then permitted to ripen at 100° C. to the desired acyl value. The ripened cellulose esters obtained by our novel ripening and hydrolysis process possess substantialy improved stability characteristics and do not require any further stabilization, such as a treatment with a dilute solution of sulfuric acid or with water at an elevated temperature and/or pressure, to produce cellulose esters which are highly stable when subjected to elevated temperatures during molding operations.

Thus, for example, for the preparation of ripened or hydrolyzed cellulose acetate of a high degree of stability by our novel process, cellulose, with or without a pretreatment to render it more reactive, is acetylated with acetic anhydride and an acid catalyst, e. g. sulfuric acid, employing glacial acetic acid as solvent for the cellulose acetate formed. The pretreatment may comprise treating cellulose with organic acids or organic acids containing some sulfuric acid. Part of the sulfuric acid employed as the catalyst and part of the glacial acetic acid may be introduced in the pretreatment. When acetylation is completed all of the free sulfuric acid in the primary solution of cellulose acetate obtained is neutralized by the addition of a sufficient quantity of a suitable neutralizing agent thereto, leaving only a very small quantity of combined sulfuric acid remaining, say 2 to 4% on the weight of the cellulose, i. e. the sulfuric acid being combined with the cellulose acetate as a sulfate. Water is then added in an amount sufficient to react with all of the acetic anhydride remaining together with additional water for ripening in an amount of 40 to 45% on the weight of the original cellulose employed. The neutralized primary solution of cellulose acetate is then heated slowly to about 30 to 40° C. by a heating medium circulating through the heating jacket of the vessel in which the solution is contained. When this temperature is reached the neutralized primary solution is then heated rapidly to about 60° to 90° C. by injecting live steam directly into the solution while jacket heat is maintained. Little or no hydrolysis of the acetyl groups takes place since there is no free sulfuric acid present in the solution. The elevated temperature together with the limited quantity of water favors the splitting off of the combined sulfates. To insure complete splitting off of the sulfates, the heated neutralized primary solution is then acidified so that an excess of about 0.5% of sulfuric acid on the weight of the cellulose originally acetylated is present and heating is continued to raise the temperature to about 100° C. After completing the splitting off of any combined sulfates in the acidified solution at this elevated temperature, the free sulfuric acid present therein, including any sulfuric acid split off from the cellulose acetate, is completely neutralized by the addition of an excess of neutralizing agent thereto. Ripening is then conducted at a temperature of 100° C. until the desired acetyl value is reached. The temperature of the ripened solution is lowered rapidly when the desired acetyl value is reached, for example, by passing cooling water through the jacket of the vessel in which the ripened cellulose acetate solution is contained or adding a quantity of precooled aqueous acetic acid directly to the batch with stirring. The ripened or hydrolyzed cellulose acetate is then precipitated from the solution by the addition of an excess of water thereto and is finally washed neutral and dried. Highly stable cellulose acetates are obtained by our novel process and very little acidity is developed when said cellulose acetates are heated with water under conditions of elevated temperature and pressure.

Any suitable neutralizing agent may be employed, such as for example, magnesium acetate, zinc acetate, aluminum acetate, calcium acetate, strontium acetate, barium acetate, strontium oxide, barium oxide, strontium hydroxide, barium hydroxide, and magnesium carbonate. We prefer to avoid the use of neutralizing agents which form sodium salts, since the presence of sodium salts during ripening is undesirable as said sodium salts, even in relatively small quantities, tend to inhibit splitting off of sulfates during ripening. In larger concentrations, the presence of sodium salts may even prevent the splitting off of said sulfate.

In order further to illustrate our invention, but without being limited thereto, the following example is given:

*Example*

528 parts by weight of cotton linters are pretreated with a mixture of 2.65 parts by weight of sulfuric acid, 2.65 parts by weight of water and 185 parts by weight of glacial acetic acid. The mixture is tumbled for a short time to insure a uniform distribution of the liquid and is then left to stand for 2 hours at a temperature of 25° C. to complete the activation of the cellulose. After this pretreatment, the cellulose is entered into an acetylizer containing 1740 parts by weight of glacial acetic acid, 1265 parts by weight of acetic anhydride and 61 parts by weight of sulfuric acid cooled to a temperature of −10° C. The acetylation reaction is allowed to continue for 1½ hours with a peak temperature of 40 to 50° C. being reached. After completion of esterification, an aqueous solution of magnesium acetate is added in an amount sufficient to neutralize all but 0.5% of the sulfuric acid originally present, based on the weight of the cellulose. The water added with said magnesium acetate is sufficient to react with all of the unreacted acetic anhydride and to give an amount of water for ripening equal to 43.5% on the weight of the cellulose originally acetylated.

The temperature of the neutralized primary cellulose acetate solution is now raised to about 30 to 40° C. by external heating and then live steam is injected directly into the solution until the temperature is about 90° C., external heat also being applied. The charge is usually alkaline at this point because of the fact that the unneutralized sulfuric acid is present in a combined form rather than as free sulfuric acid. To insure splitting off of the remaining combined sulfates, the heated primary solution is rendered acid by the addition of sulfuric acid thereto, the acid being in the form of a solution in acetic acid containing a small amount of water. The amount of free sulfuric acid which is added is such that the latter is present in a quantity equal to 0.5% on the weight of the cellulose. With the free sulfuric acid present, heating is continued by direct steam injection for about 15 minutes during which time the temperature is gradually raised to 100° C. The free sulfuric acid is then completely neutralized by the addition of excess aqueous magnesium acetate to the solution in an amount of about 10% over the theoretical quantity required to react with the free sulfuric acid present and the primary cellulose acetate solution is allowed to ripen at 100° C. to the desired acetyl value, for example about 56%, calculated as acetic acid. The ripened primary cellulose acetate solution is cooled rapidly to a temperature of about 35° C. and the ripened cellulose acetate is then precipitated, washed and dried. Since some ripening takes place during cooling it is preferable to commence cooling the solution at a point where the acetyl value of the cellulose is slightly higher than that desired in the final product so that the small amount of ripening taking place during the cooling period will produce a cellulose acetate of the desired acetyl value when the ripened solution is finally cool enough to be precipitated.

While our invention has been more particularly described in connection with the production of highly stable, ripened cellulose acetate, it will be understood, of course, that our novel stabilizing process may also be employed in the production of other highly stable ripened or hydrolyzed organic acid esters of cellulose. Examples of other organic acid esters of cellulose which may be prepared by our novel process are cellulose proprionate and cellulose butyrate, as well as mixed esters, such as cellulose acetate-proprionate, and cellulose acetate-butyrate.

It is to be understood that the foregoing detailed description is given merely by way of illustration and that many variations may be made therein without departing from the spirit of our invention.

Having described our invention, what we desire to secure by Letters Patent is:

1. In a process for the production of organic acid esters of cellulose of improved characteristics wherein cellulose is esterified with an aliphatic acid anhydride employing an aliphatic acid as solvent and an inorganic acid catalyst, the steps which comprise neutralizing the free inorganic acid in the primary cellulose ester solution obtained on completion of esterification by adding a neutralizing agent thereto together with water for ripening, heating the neutralized primary solution to a temperature of 60 to 90° C. by injecting steam directly therein, adding a sufficient amount of said inorganic acid thereto to render the primary solution acid, heating the acidified solution to ripening temperature, neutralizing the inorganic acid in said solution by the addition of an excess of neutralizing agent thereto, and ripening the primary cellulose ester in solution to a secondary cellulose ester.

2. In a process for the production of organic acid esters of cellulose of improved characteristics wherein cellulose is esterified with an aliphatic acid anhydride employing an aliphatic acid as solvent and sulfuric acid as catalyst, the steps which comprise neutralizing the free sulfuric acid in the primary cellulose ester solution obtained on completion of esterification by adding a neutralizing agent thereto together with water for ripening, heating the neutralized primary solution to a temperature of 60 to 90° C. by injecting steam directly therein, adding a sufficient amount of sulfuric acid thereto to render the heated primary solution acid, heating the acidified solution to ripening temperature over a short period of time, neutralizing the sulfuric acid in said solution by the addition of an excess of neutralizing agent thereto, and ripening the primary cellulose ester in solution to a secondary cellulose ester.

3. In a process for the production of cellulose acetate of improved characteristics wherein cellulose is esterified with acetic anhydride employing acetic acid as solvent and sulfuric acid as catalyst, the steps which comprise neutralizing the free sulfuric acid in the primary cellulose acetate solution obtained on completion of esterification by adding a neutralizing agent thereto together with water for ripening, heating the neutralized primary solution to a temperature of 60 to 90° C. by injecting steam directly therein, adding a sufficient amount of sulfuric acid thereto to render the heated primary solution acid, heating the acidified solution to ripening temperature over a short period of time, neutralizing the sulfuric acid in said solution by the addition of an excess of neutralizing agent thereto, and ripening the primary cellulose acetate in solution to a secondary cellulose acetate at the ripening temperature.

4. In a process for the production of cellulose acetate of improved characteristics wherein cellulose is esterified with acetic anhydride employing acetic acid as solvent and sulfuric acid as catalyst, the steps which comprise neutralizing the free sulfuric acid in the primary cellulose acetate solution obtained on completion of esterification by adding a neutralizing agent thereto together with water for ripening, heating the neutralized primary solution to a temperature of 60 to 90° C. by injecting steam directly therein, adding a sufficient amount of sulfuric acid thereto to render the heated primary solution acid, heating the acidified solution to a ripening temperature of about 100° C. over a short period of time, neutralizing the sulfuric acid in said solution by the addition of an excess of neutralizing agent thereto, and ripening the primary cellulose acetate in solution to a secondary cellulose acetate at the ripening temperature.

5. In a process for the production of cellulose acetate of improved characteristics wherein cellulose is esterified with acetic anhydride employing acetic acid as solvent and sulfuric acid as catalyst, the steps which comprise neutralizing the free sulfuric acid in the primary cellulose acetate solution obtained on completion of esterification by adding a neutralizing agent thereto together with water for ripening, heating the neutralized primary solution to a temperature of 60 to 90° C. by injecting steam directly therein, adding a sufficient amount of sulfuric acid thereto to render the heated primary solution acid, the acidified primary solution containing no more than about 0.5% of free sulfuric acid on the weight of the cellulose, heating the acidified solution to ripening temperature of about 100° C. over a short period of time, neutralizing the sulfuric acid in said solution by the addition of an excess of neutralizing agent thereto, and ripening the primary cellulose acetate in solution to a secondary cellulose acetate at the ripening temperature.

6. In a process for the production of cellulose acetate of improved characteristics wherein cellulose is esterified with acetic anhydride employing acetic acid as solvent and sulfuric acid as catalyst, the steps which comprise neutralizing the free sulfuric acid in the primary cellulose acetate solution obtained on completion of esterification by adding magnesium acetate thereto together with water for ripening, heating the neutralized primary solution to a temperature of 60 to 90° C. by injecting steam directly therein, adding a sufficient amount of sulfuric acid thereto to render the heated primary solution acid, the acidified primary solution containing no more than about 0.5% of free sulfuric acid on the weight of the cellulose, heating the acidified solution to ripening temperature of about 100° C. over a short period of time, neutralizing the sulfuric acid in said solution by the addition of an excess of magnesium acetate thereto, and ripening the primary cellulose acetate in solution to a secondary cellulose acetate at the ripening temperature.

7. In a process for the production of cellulose acetate of improved characteristics wherein cellulose is esterified with acetic anhydride employing acetic acid as solvent and sulfuric acid as catalyst, the steps which comprise neutralizing the free sulfuric acid in the primary cellulose acetate solution obtained on completion of esterification by adding magnesium acetate thereto together with from 40 to 45% of water on the weight of the cellulose for ripening, heating the neutralized primary solution to a temperature of 60 to 90° C. by injecting steam directly therein, adding a sufficient amount of sulfuric acid thereto to render the heated primary solution acid, the acidified primary solution containing no more than about 0.5% of free sulfuric acid on the weight of the cellulose, heating the acidified solution to ripening temperature of about 100° C. over a short period of time, neutralizing the sulfuric acid in said solution by the addition of an excess of magnesium acetate thereto, and ripening the primary cellulose acetate in solution to a secondary cellulose acetate at the ripening temperature.

GEORGE W. SEYMOUR.
MERVIN E. MARTIN.

REFERENCES CITED

The following references are of record in the file of this patent:

UNITED STATES PATENTS

| Number | Name | Date |
| --- | --- | --- |
| 2,071,333 | Dreyfus | Feb. 23, 1937 |
| 2,259,462 | Fletcher | Oct. 21, 1941 |
| 2,285,536 | Seymour | June 9, 1942 |